(12) United States Patent
Nechitailo

(10) Patent No.: US 6,445,860 B1
(45) Date of Patent: Sep. 3, 2002

(54) FUNCTIONALLY PRE-STRESSED RIBBON STACK

(75) Inventor: Nicholas V. Nechitailo, Newton, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/750,126

(22) Filed: Dec. 29, 2000

(51) Int. Cl.7 ................................................. G02B 6/44
(52) U.S. Cl. ...................................................... 385/114
(58) Field of Search .............................. 385/110, 111, 385/112, 113, 114

(56) References Cited

U.S. PATENT DOCUMENTS

| | | | | |
|---|---|---|---|---|
| 4,900,126 A | * | 2/1990 | Kackson et al. ............. | 385/114 |
| 5,193,134 A | * | 3/1993 | Pizzorno et al. ............. | 385/100 |
| 5,331,796 A | | 7/1994 | Varga .............................. | 57/9 |
| 5,487,261 A | | 1/1996 | Varga .............................. | 57/9 |
| 5,531,064 A | | 7/1996 | Sawano et al. ................ | 57/204 |
| 5,651,082 A | | 7/1997 | Eoll ............................. | 385/114 |
| 5,715,344 A | | 2/1998 | Seo et al. .................... | 385/110 |
| 5,751,881 A | * | 5/1998 | Konda et al. ................ | 385/110 |
| 5,845,032 A | * | 12/1998 | Londa et al. ................ | 385/110 |
| 6,052,502 A | | 4/2000 | Coleman ..................... | 385/114 |
| 6,122,426 A | * | 9/2000 | Ishikawa et al. ............ | 385/105 |

* cited by examiner

Primary Examiner—Tulsidas Patel
(74) Attorney, Agent, or Firm—Sughrue Mion, PLLC

(57) ABSTRACT

An optical fiber ribbon stack in which individual ribbons are pre-stressed according to a predetermined tension/compression distribution before being laminated together in a stack. This distribution corresponds to expected thermomechanical conditions which occur during the service of the cable housing the ribbon stack, and may be linear or non-linear, symmetric or non-symmetric, producing straight or curved stacks.

20 Claims, 13 Drawing Sheets

+

+

FUNCTIONALLY PRE-STRESSED RIBBON STACK

BACKGROUND OF THE INVENTION

1. Field of the Invention

The present invention relates generally to a fiber optic cable having a pre-stressed ribbon stack, and more particularly to a cable having stacked ribbons which are pre-stressed according to a distribution that corresponds to expected thermo-mechanical conditions to occur during the service of the cable.

2. Description of the Related Art

In fiber optic cables with stranded, twisted, or straight ribbon stacks, the corner fibers experience a high level of attenuation, which reduces the cable's performance characteristics and limits the level of recommended thermo-mechanical loads. As shown in FIG. 4, the corner fibers 41a of the laminated ribbon stack 41 of the fiber optic cable 40 are located the most remotely from the geometrical center of the ribbon stack. Consequently, under mechanical bending and contact stresses from surrounding cable components such as buffer tube 42, the corner fibers 41a usually have maximum stress levels as compared with the centrally located fibers. Moreover, under thermal loading, the thermoplastic material of the buffer tube 42 expands and contracts in both longitudinal and radial directions. Corresponding displacement of the thermally loaded buffer tube 42 places an additional stress on the corner fibers 41a. The attenuation in the corner fibers 41a of the ribbon stack 41 may be reduced by increasing the gap between the corners of the ribbon stack 41 and the buffer tube 42 (i.e., by providing a larger buffer tube). But this approach leads to an undesirable increase in the cable diameter.

SUMMARY OF THE INVENTION

It is an object of the present invention to improve the optical performance of the cable through increased thermo-mechanical load resistance of a cable in which a laminated ribbon stack is provided.

It is a further object of the present invention to reduce the attenuation experienced by the corner fibers of an optical fiber ribbon stack provided in a cable, without increasing the diameter of the cable.

These objects are fulfilled by constructing an optical fiber ribbon stack in which some of the optical fiber ribbons are pre-stressed according to a predetermined tension/compression distribution before being laminated together in a stack. This distribution corresponds to expected thermo-mechanical conditions which occur during the service of the cable housing the ribbon stack, and may be linear or non-linear, symmetric or non-symmetric, including anti-symmetric.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

The present invention resides in providing a ribbon stack in which the individual ribbons are pre-stressed before being laminated together. The ribbons are pre-stressed according to a stress distribution that corresponds to the thermo-mechanical conditions that are expected during the cable's service. The stress distribution is either a non-linear or linear curve across the ribbon stack's thickness (i.e., from one outer most ribbon to the other). The stress distribution may include compression stresses (designated as negative values) as well as tensile stresses (designated as positive values).

First Embodiment

Figure 1A:
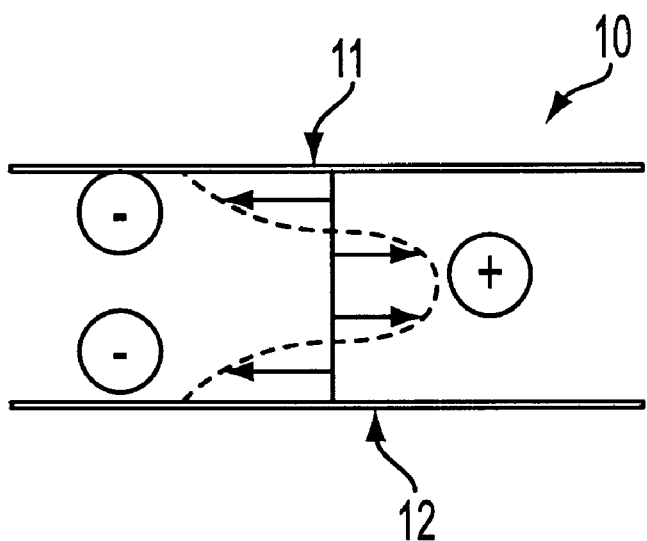
FIG. 1(a) illustrates a side view of a laminated ribbon stack symmetrically pre-stressed according to a first embodiment of the present invention.

FIG. 1(a) illustrates a side view of a laminated ribbon stack 10 symmetrically pre-stressed according to a first embodiment of the present invention. The non-linear symmetric stress distribution avoids attenuation due to expected mechanical tension and bending about a point or axis.

The ribbon stack 10 includes an upper most ribbon 11, a lower most ribbon 12, and other ribbons therebetween. The outer most ribbons (i.e., the upper most and lower most ribbons) are pre-compressed, but not enough to buckle the ribbons. The inner ribbons, on the other hand, are pre-stretched. This pre-compression/pre-stretching is accomplished by stretching the inner ribbons to a greater degree than the outer ribbons, and then laminating the ribbons together in the form of a ribbon stack. After lamination the more greatly stretched inner ribbons will have a stronger tendency to relax and return to their original state, resulting in a compression force being imparted on the outer most ribbons (shown as a negative value in FIG. 1(a)) and a tensile force remaining on the inner ribbons (shown as a positive value in FIG. 1(a)).

Figure 1B:
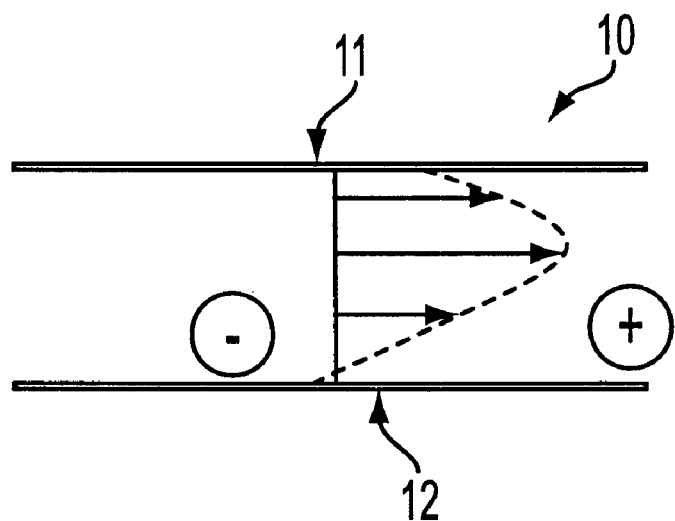
FIG. 1(b) illustrates a side view of a resulting stress distribution when the pre-stressed ribbon stack of FIG. 1(a) is stretched and bent as shown in FIG. 5(a)
Figure 1C:
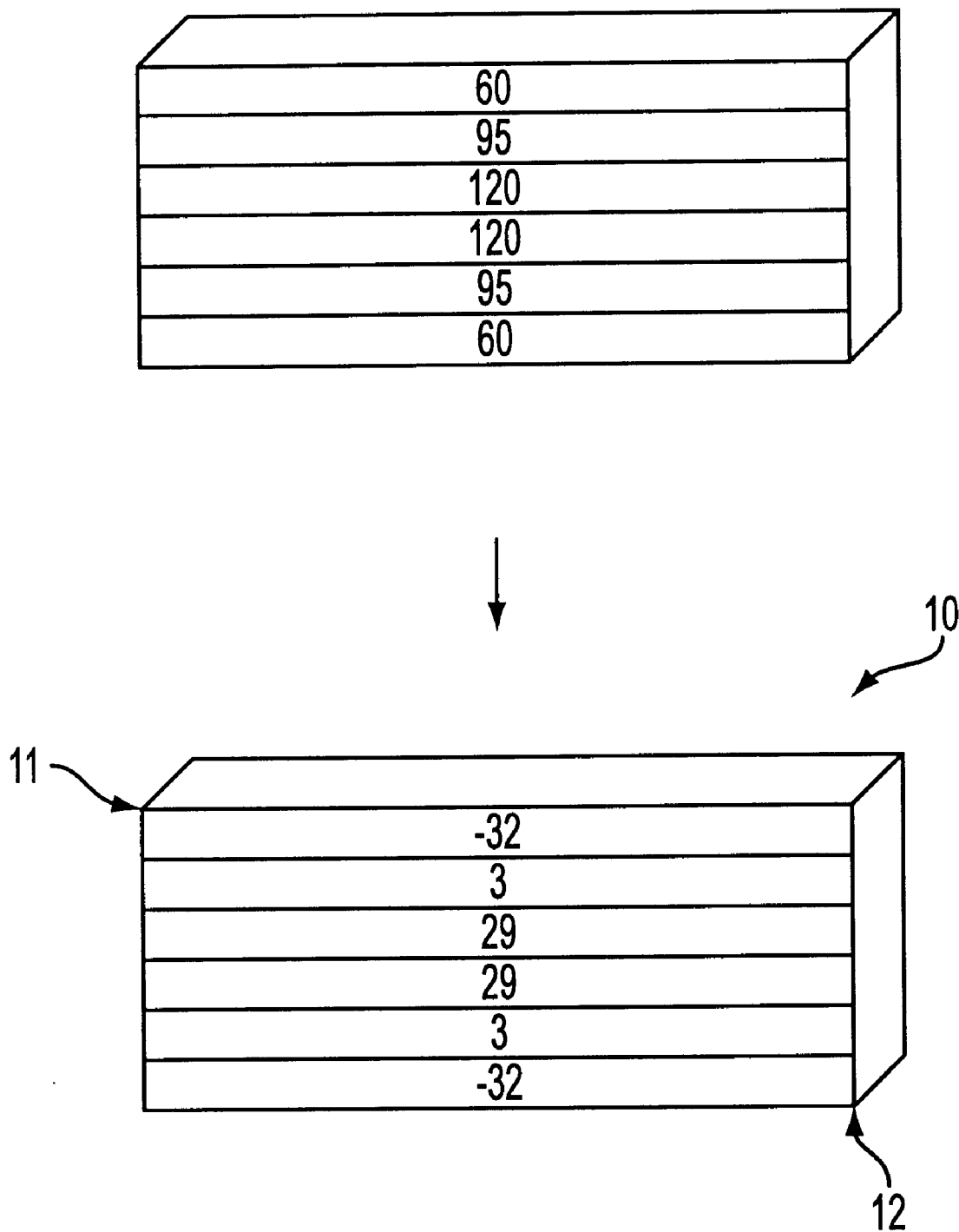
FIGS. 1(c) and 1(d) illustrate numerical examples of the stress distributions of FIGS. 1(a), 1(b) and 5(b)

The formation of the pre-stressed laminated ribbon stack 10 shown in FIG. 1(a) will now be explained in more detail with reference to the example illustrated in FIG. 1(c). This figure shows a ribbon stack of six ribbons horizontally laid on top of one another. The upper portion of the figure shows the ribbon stack after the tensile stresses are imparted onto the ribbons but prior to lamination, and the lower portion of the figure shows the ribbon stack after lamination. The numbers represent grams of force, typically applied per individual fiber, a positive number being a tensile force and a negative number being a compression force.

Prior to lamination each of the ribbons is subjected to a particular tensile force. The inner ribbons are subjected to a larger tensile force than the outer ribbons. In the example shown in FIG. 1(c), the two inner-most ribbons are subjected to a tensile force of 120 grams, the next two inner most ribbons are subjected to a tensile force of 95 grams, and the outer ribbons are subjected to a tensile force of 60 grams. None of the individual ribbons is compressed before lamination.

The stressed ribbons are laminated together to form a laminated ribbon stack. Due to elastic unloading, the varying tensile forces of the individual ribbons counteract each other to form a residual or final stress distribution across the ribbon stack. That is, the ribbons with the larger tensile forces will have a greater tendency to shrink back to their stress-free states, thereby imparting compression forces on the ribbons with the smaller tensile forces. More specifically, the stress on each ribbon of the laminated ribbon stack is approximately equal to the difference between the particular ribbon's pre-lamination tensile stress and the average tensile stress across the width (i.e., from top to bottom) of the pre-lamination ribbon stack. In the example of FIG. 1(c), the average pre-lamination tensile force is approximately 92 grams, and thus the post-lamination or residual stresses of the inner most ribbons is 29 grams, the next inner most ribbons is 3 grams and the outer most ribbons is –32 grams, the negative number indicating a compression stress. This example laminated ribbon stack 10 has a symmetric stress distribution, and is shown in the bottom portion of FIG. 1(c).

The stresses resulting from simultaneous stretching and bending a ribbon stack with respect to a point or axis will now be explained.

Figure 5A:
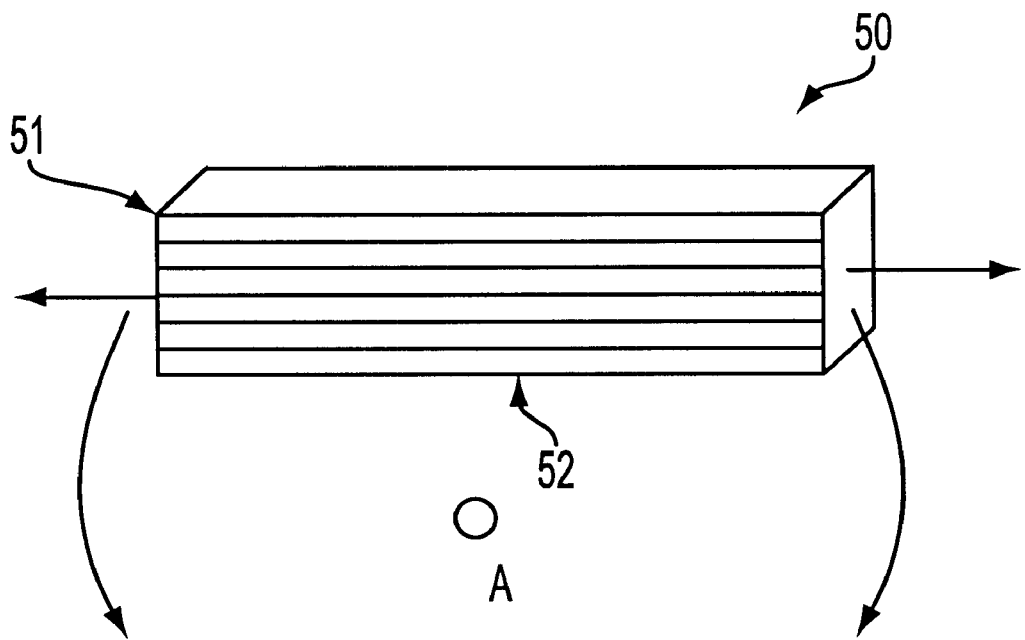
FIG. 5(a) illustrates a side isometric view of a non-pre-stressed laminated ribbon stack stretched and bent with respect to a point or axis A.
Figure 5B:
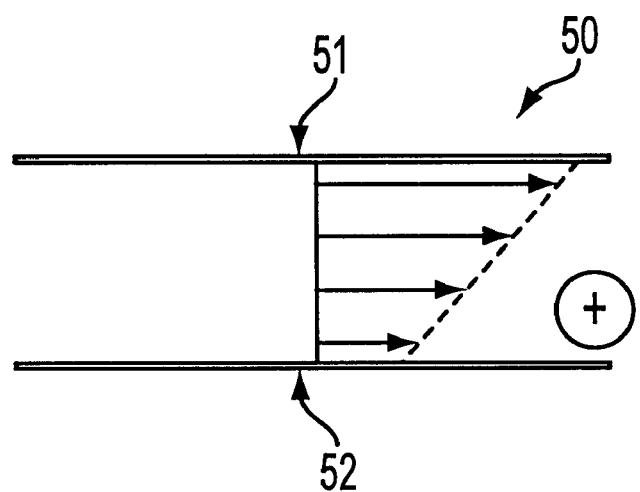
FIG. 5(b) illustrates a side view of the ribbon stack of FIG. 5(a) with a stress distribution resulting from stretching and bending.

FIG. 5(a) illustrates a side isometric view of an ordinary (i.e., non-pre-stressed) laminated ribbon stack 50 stretched and bent with respect to a point or axis A. When this ribbon stack 50 is stretched and bent about the point or axis A, the resulting stress distribution across the ribbon stack 50 is as shown in FIG. 5(b). The top ribbon 51 has a higher tensile stress (and associated micro-bending) as compared with the other ribbons in the stack 50.

High levels of stress caused by stretching and bending in the top ribbon of the stack can be significantly reduced by pre-stressing the ribbon stack according to the stress distribution shown in FIG. 1(a), discussed above. When this pre-stressed ribbon stack 10 is bent, the pre-compression in the outer most ribbon is compensated with the induced tensile stress in the top ribbon 11. This stress compensation effect is depicted in FIG. 1(b), which shows the stress on the top ribbon 11 not being nearly as great as that of the top ribbon 51 of the ordinary (non-pre-stressed) stack 50 of FIG. 5(b).

Figure 1D:
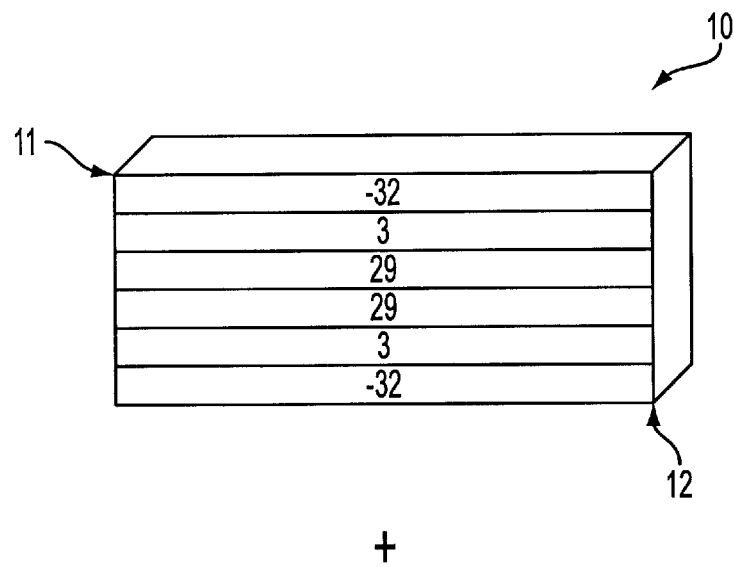
Figure 1D:
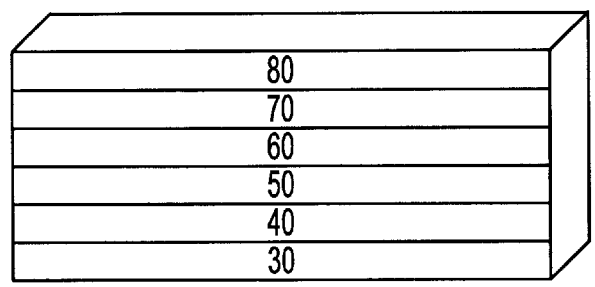
Figure 1D:
Figure 1D:
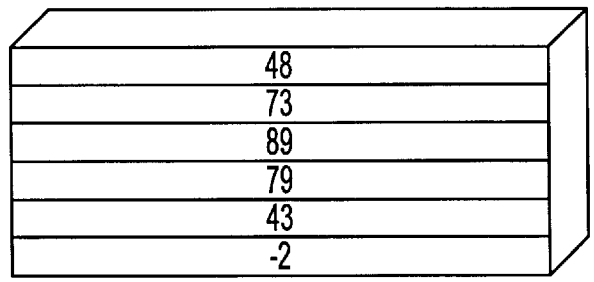

The stretching and bending of the pre-stressed ribbon stack 10 of FIG. 1(a) will now be explained in more detail with reference to the example illustrated in FIG. 1(d). This example is a ribbon stack of six ribbons horizontal laid on top of one another. The upper portion of the figure shows the stress distribution of the ribbon stack after lamination in accordance with the invention, the middle portion shows the stress distribution of an ordinary ribbon stack stretched and bent with respect to a point or axis (as discussed with respect to FIGS. 5(a) and 5(b)), and the lower portion of the figure shows the stress distribution of the pre-stressed ribbon stack of the present invention when stretched and bent in such a manner. The numbers represent grams of force, a positive number being a tensile force and a negative number being a compression force. As shown in the lower portion of FIG. 1(d), there is a resulting tensile force of 48 grams on the upper ribbon and a compression force of –2 grams on the lower ribbon. These forces have significantly lower absolute values than the tensile force of 80 grams on the upper ribbon and 30 grams on the lower ribbon observed in the regular case of non-pre-stressed ribbon stacks. The result is a ribbon stack having comer fibers of the upper and lower ribbons less subjected to micro-bending and attenuation.

Second Embodiment

Figure 2A:
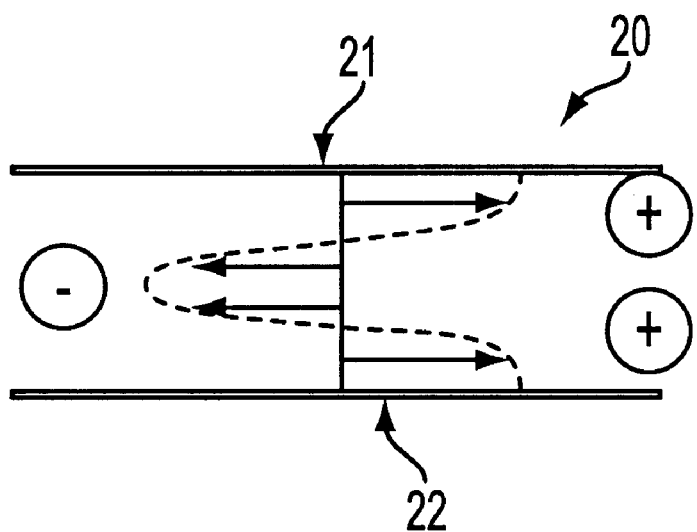
FIG. 2(a) illustrates a side view of a laminated ribbon stack symmetrically pre-stressed according to a second embodiment of the present invention.

FIG. 2(a) illustrates a side view of a laminated ribbon stack 20 symmetrically pre-stressed according to a second embodiment of the present invention. This symmetric, non-linear stress distribution avoids attenuation that can be caused by cold temperatures.

The ribbon stack 20 includes an upper most ribbon 21, a lower most ribbon 22 and other ribbons therebetween. The outer most ribbons are pre-stretched, while the inner most ribbons are pre-compressed. This pre-stretching/pre-compression is accomplished by stretching the outer ribbons to a greater degree than the inner ribbons, and then laminating the ribbons together in the form of a ribbon stack 20. After lamination the more greatly stretched outer ribbons 21, 22 will have higher elastic unloading forces to return to their stress-free state. This result in a compression force being imparted on the inner ribbons (shown as a negative value in FIG. 2(a)) and a tensile force remaining on the outer ribbons (shown as a positive value in FIG. 2(a)) when the state of equilibrium of the stack is achieved.

Figure 2B:
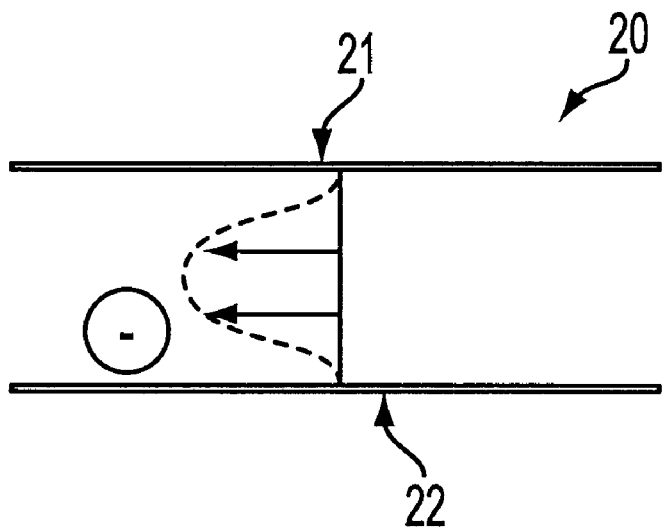
FIG. 2(b) illustrates a side view of a resulting stress distribution when the pre-stressed ribbon stack of FIG. 2(a) is subjected to cold temperatures.
Figure 2C:
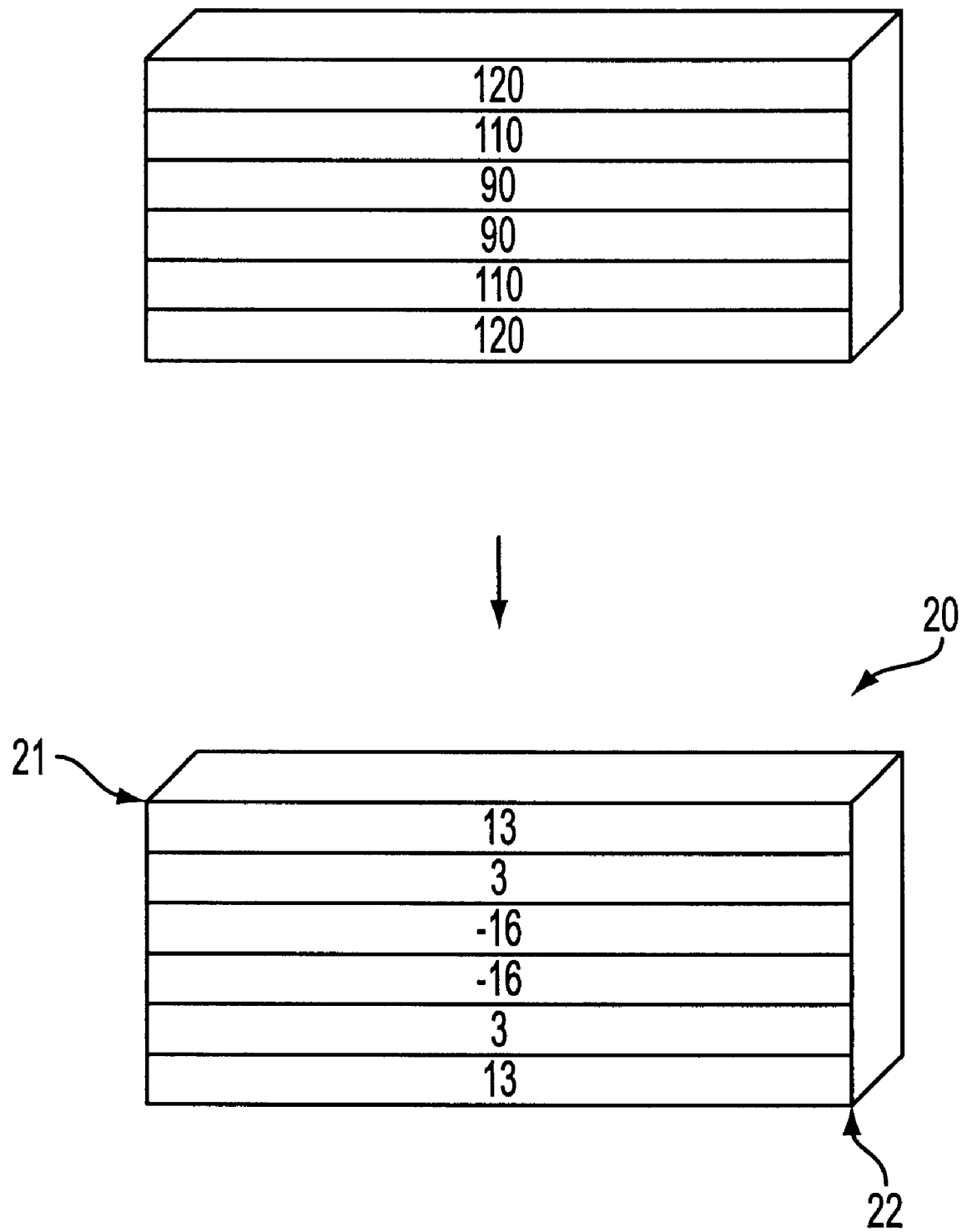
FIGS. 2(c) and 2(d) illustrate numerical examples of the stress distributions of FIGS. 2(a), 2(b) and 6.

The formation of the laminated ribbon stack 20 shown in FIG. 2(a) will now be explained in more detail with reference to the example illustrated in FIG. 2(c). This figure shows a ribbon stack of six ribbons horizontal laid on top of one another. The upper portion of the figure shows the ribbon stack after the tensile stresses are imparted onto the ribbons but prior to lamination, and the lower portion of the figure shows the ribbon stack after lamination.

Prior to lamination each of the inner ribbons are subjected to a larger tensile force than the outer ribbons. In the example shown in FIG. 2(c), the two inner-most ribbons are subjected to a tensile force of 90 grams, the two next ribbons are subjected to a tensile force of 10 grams, and the outer ribbons are subjected to a tensile force of 120 grams.

The stressed ribbons are laminated together to form a laminated ribbon stack. The varying tensile forces of the individual ribbons then counteract each other to form a stress distribution across the ribbon stack. That is, the ribbons with the larger tensile forces will have greater elastic unloading forces to move back to their stress-free states, thereby imparting compression forces on the ribbons with the smaller tensile forces. When the state of equilibrium of the stack is achieved, the result is a symmetric stress distribution as shown in the bottom portion of FIG. 2(c). The post-lamination stresses of the inner most ribbons is −16 grams, which is a compression force, the next inner most ribbons is 3 grams and the outer most ribbons is 13.

The stresses on the ribbon stack 20 resulting from the cable, which houses the stack 20, being subjected to cold temperatures will now be explained.

Figure 6:
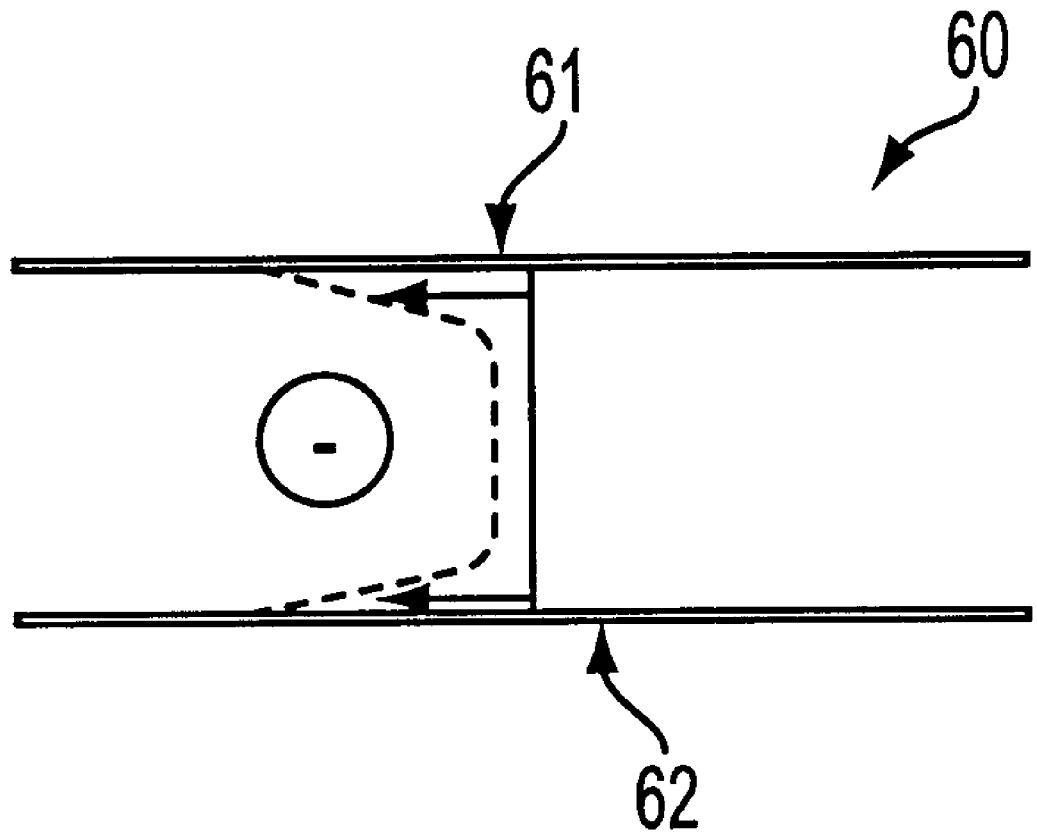
FIG. 6 illustrates a side view of an ordinary (i.e., non-pre-stressed) laminated ribbon stack that is subjected to a cold temperature.

FIG. 6 illustrates a side view of an ordinary (i.e., non-pre-stressed) laminated ribbon stack 60 that is subjected to a cold temperature. When the cable housing of this ribbon stack 60 is subjected to a cold environment, the force of the shrinking displacement of the thermoplastic buffer tube is transmitted to the ribbon stack 60 superimposing stresses of compression on the outer most ribbons 61, 62 and corner fibers of these ribbons.

The negative effects cold temperatures have on the corner fibers of the top ribbon 61 of the stack 60 can be significantly reduced by pre-stressing the ribbon stack with tensile forces according to the stress distribution shown in FIG. 2(a), discussed above. When the this pre-stressed ribbon stack 20 is subjected to cold environments, the superposition of thermal compression and pre-existing tensile force in the outer most ribbons 21, 22 will favorably reduce stresses on the outer ribbons 21, 22 that would have otherwise occurred. This resulting stress distribution is depicted in FIG. 2(b).

Figure 2D:
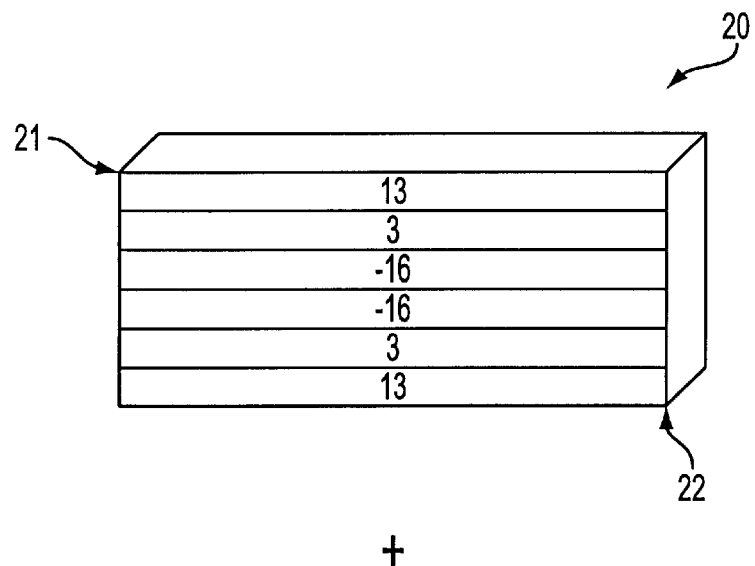
Figure 2D:
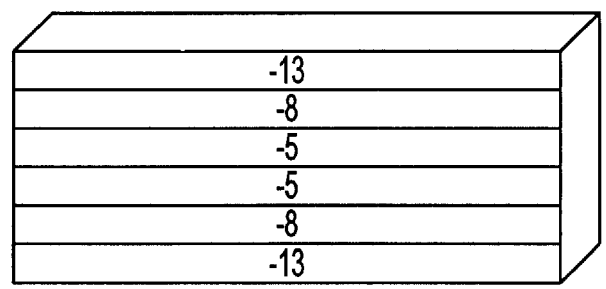
Figure 2D:
Figure 2D:
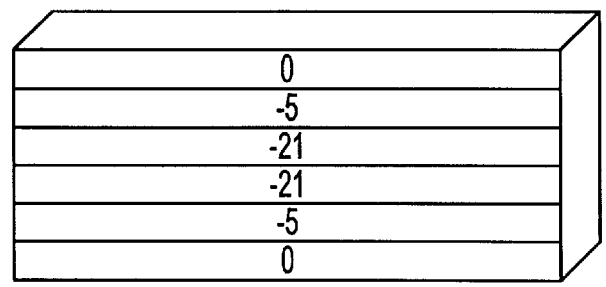

The pre-stressed ribbon stack 20 of FIG. 2(a) subjected to cold temperatures will now be explained in more detail with reference to the example illustrated in FIG. 2(d). This figure uses as an example a ribbon stack of six ribbons horizontal laid on top of one another. The upper portion of the figure shows the stress distribution of the ribbon stack 20 after lamination, the middle portion shows the stress distribution of an ordinary (i.e., non-pre-stressed) ribbon stack subjected to cold temperatures (as discussed with respect to FIG. 6), and the lower portion of the figure shows the stress distribution of the pre-stressed ribbon stack when subjected to cold. As shown in the lower portion of FIG. 2(d), the resulting stress in the upper most and lower most ribbons are equal to zero. Consequently, the corner fibers of the pre-stressed ribbon stack 20 can be subjected to much lower temperatures in order to reach levels of thermally induced stress, in which excessive levels of compression stresses typically cause localized micro-bending and buckling of fibers along with associated attenuation problems.

Third Embodiment

Figure 3A:
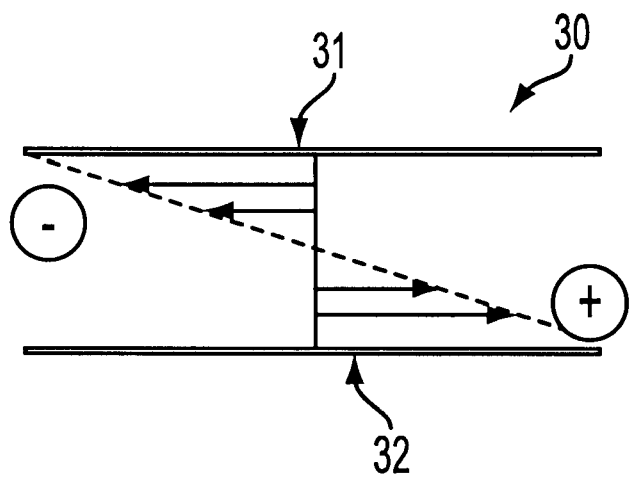
FIG. 3(a) illustrates a side view of a laminated ribbon stack non-symmetrically pre-stressed according to a third embodiment of the present invention.

FIG. 3(a) illustrates a side view of a laminated ribbon stack 30 non-symmetrically pre-stressed according to a third embodiment of the present invention. This non-symmetric stress distribution results in a pre-curved ribbon stack and can be used to reduce attenuation under mechanical bending with respect to the axis of the ribbon stack, or can be advantageously used for twist and helical stranding of ribbon stacks. Other linear or non-linear stress distribution curves including anti-symmetric, non-linear distributions can be used for these purposes.

In the first two embodiments the stress distributions are symmetric. Symmetric stress distributions occur when the outer ribbons are pre-stressed equally and the distribution of stresses through the ribbon stack is symmetric, thereby resulting in the final shape of the ribbon stack being straight. The stress distribution of the third embodiment is non-symmetric and thus results in a ribbon stack that is curved or twisted.

Returning to FIG. 3(a), the ribbon stack 30 includes an upper most ribbon 31, a lower most ribbon 32, and other ribbons therebetween. The upper half of the ribbon stack 30, including the upper most ribbon 31, is pre-stretched. The lower half of the stack 30, including the lower most ribbon 32, is pre-compressed, but not enough to buckle the ribbons. This pre-stretching/pre-compression is accomplished by stretching the upper ribbons to a greater degree than the lower ribbons, and then laminating the ribbons together in the form of a ribbon stack. After lamination the more greatly stretched upper ribbons will have higher force of elastic unloading to return to their stress-free state, resulting in a compression force being imparted on the lower ribbons (shown as a negative value in FIG. 3(a)) and a tensile force remaining in the upper ribbons (shown as a positive value in FIG. 3(a)).

Figure 3B:
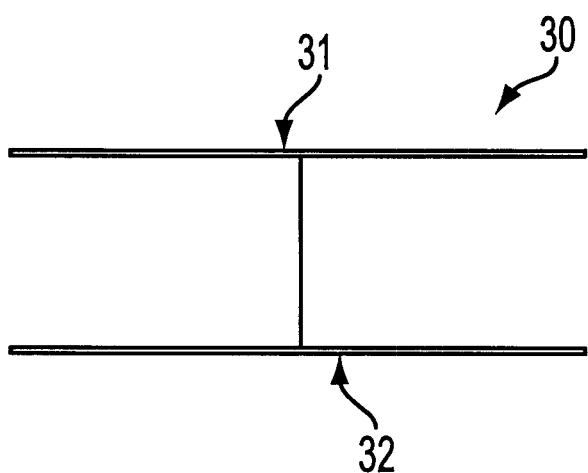
FIG. 3(b) illustrates a side view of a resulting stress distribution when the pre-stressed ribbon stack of FIG. 3(a) is bent as shown in FIG. 7(a)
Figure 3C:
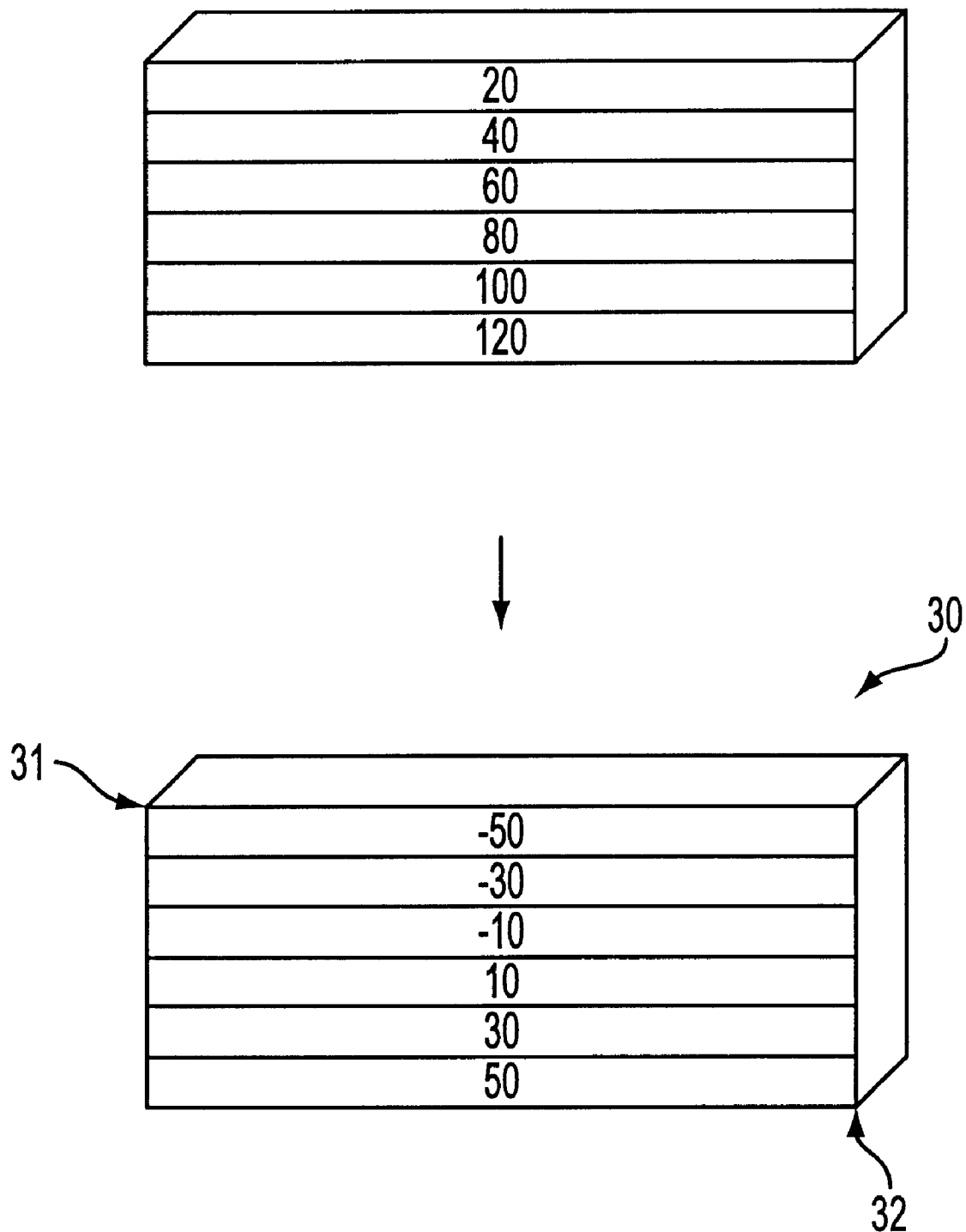
FIGS. 3(c) and 3(d) illustrate numerical examples of the stress distributions of FIGS. 3(a), 3(b) and 7(b)

The formation of the laminated ribbon stack 30 shown in FIG. 3(a) will now be explained in more detail with reference to the example illustrated in FIG. 3(c). This figure shows a ribbon stack of six ribbons horizontal laid on top of one another. The upper portion of the figure shows the ribbon stack after the tensile stresses are imparted onto the ribbons but prior to lamination, and the lower portion of the figure shows the ribbon stack after lamination.

Prior to lamination the upper ribbons are subjected to a larger tensile force than the lower ribbons. In the example shown in FIG. 3(c), the ribbons are subjected to a forces of 120, 100, 80, 60, and 20 grams, respectively, from the lower most ribbon to the upper most ribbon.

The stressed ribbons are laminated together to form a laminated ribbon stack. The varying tensile forces of the individual ribbons then counteract each other to form a stress distribution across the ribbon stack. That is, the ribbons with the larger tensile forces will have higher elastic unloading force to shrink back to their zero-stress states, thereby imparting compression forces on the ribbons with the smaller tensile forces. The result is a laminated ribbon stack having an anti-symmetric stress distribution as shown in the bottom portion of FIG. 3(c).

Figure 7A:
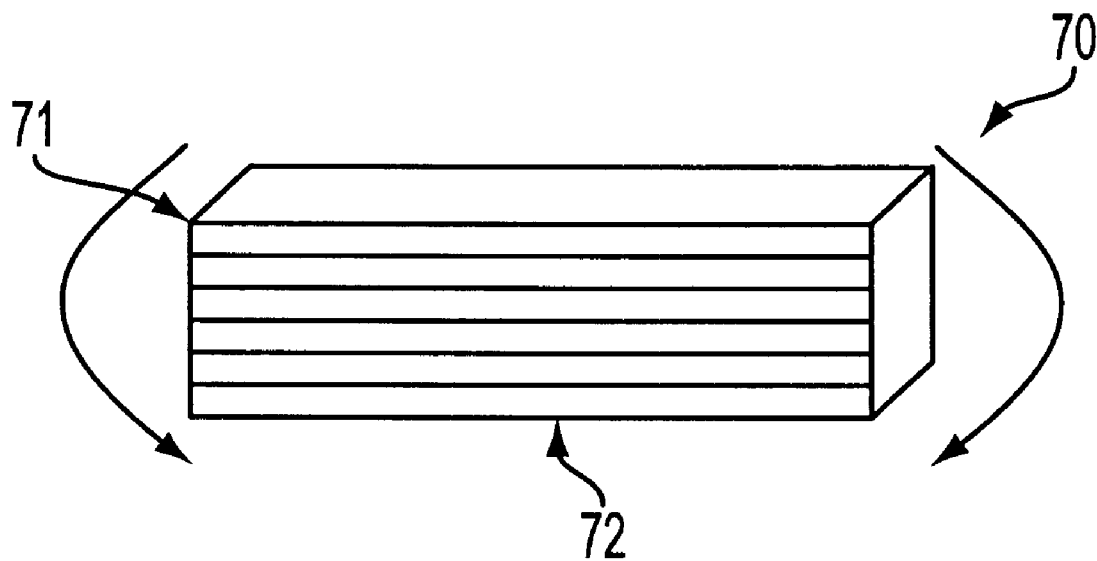
FIG. 7(a) illustrates a side isometric view of a non-pre-stressed laminated ribbon stack subjected to pure bending with respect to the axis of the ribbon stack.
Figure 7B:
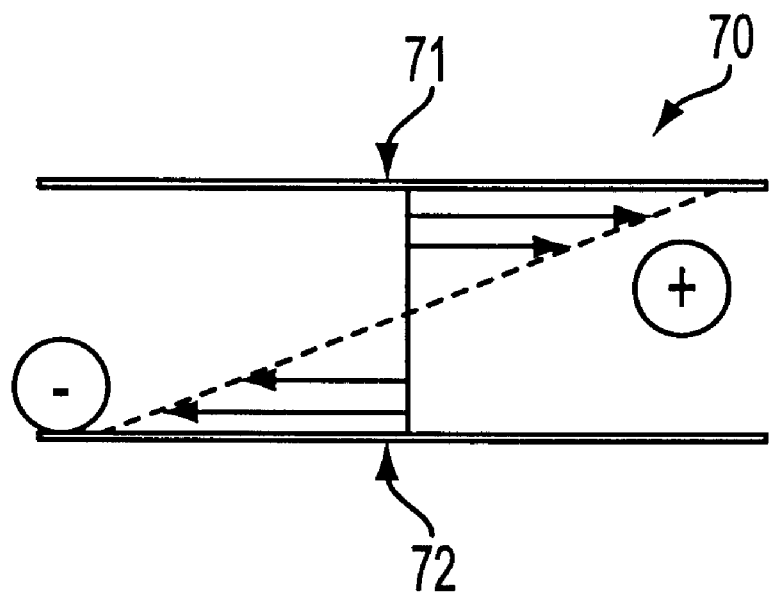
FIG. 7(b) illustrates a side view of the ribbon stack of FIG. 7(a) with a stress distribution resulting from bending with respect to the axis of the ribbon stack.

The stresses resulting from bending a ribbon stack at its axis will now be explained. FIG. 7(a) illustrates a side isometric view of a non-pre-stressed laminated ribbon stack 70 subjected to pure bending with respect to the axis of the ribbon stack, and FIG. 7(b) illustrates a side view of the ribbon stack of FIG. 7(a) with a stress distribution resulting from bending with respect to the axis of the ribbon stack. As clearly seen in these figures, the resulting levels of stresses (and associated microbending) on the top ribbon 71 and bottom ribbon 72 are significant as compared with the other ribbons in the stack 70.

The level of bending stress in the stack can be significantly reduced by pre-stressing the ribbon stack according to the stress distribution shown in FIG. 3(a), discussed above. When the this pre-stressed ribbon stack 30 is bent, the pre-compression in the upper most ribbon 31 and the pre-tensile stress in the lower most ribbon 72 are compensated by the stress distribution due to the stack bending, thereby altogether reducing the stress levels in the top and bottom ribbons 31, 32 that would have otherwise occurred. This effect is depicted in FIG. 3(b), which shows the stresses in which the whole stack including the upper most ribbon 31 and the lower most ribbon 32 being virtually eliminated.

Figure 3D:
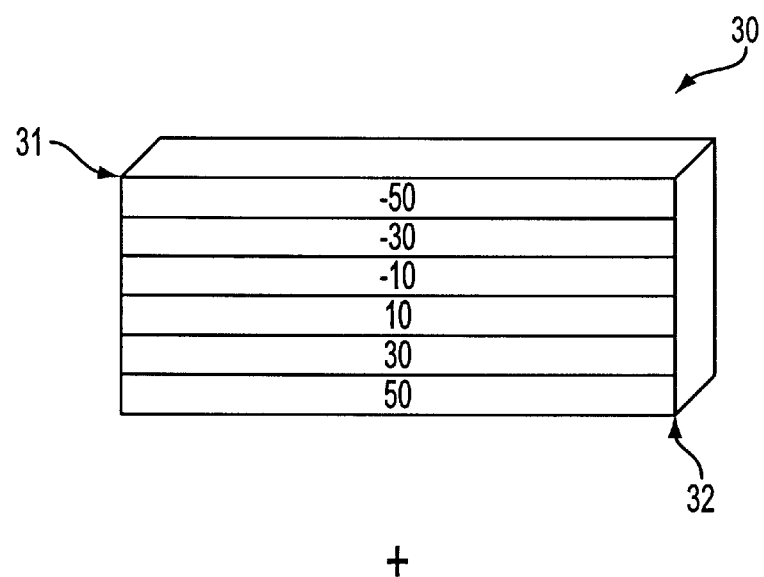
Figure 3D:
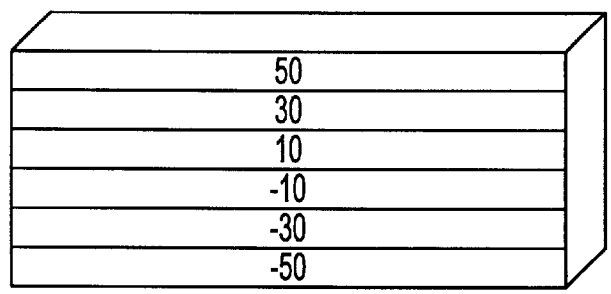
Figure 3D:
Figure 3D:
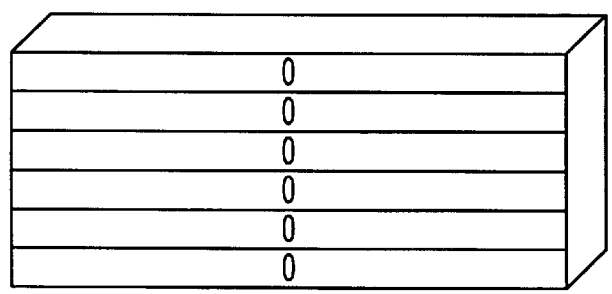
Figure 4:
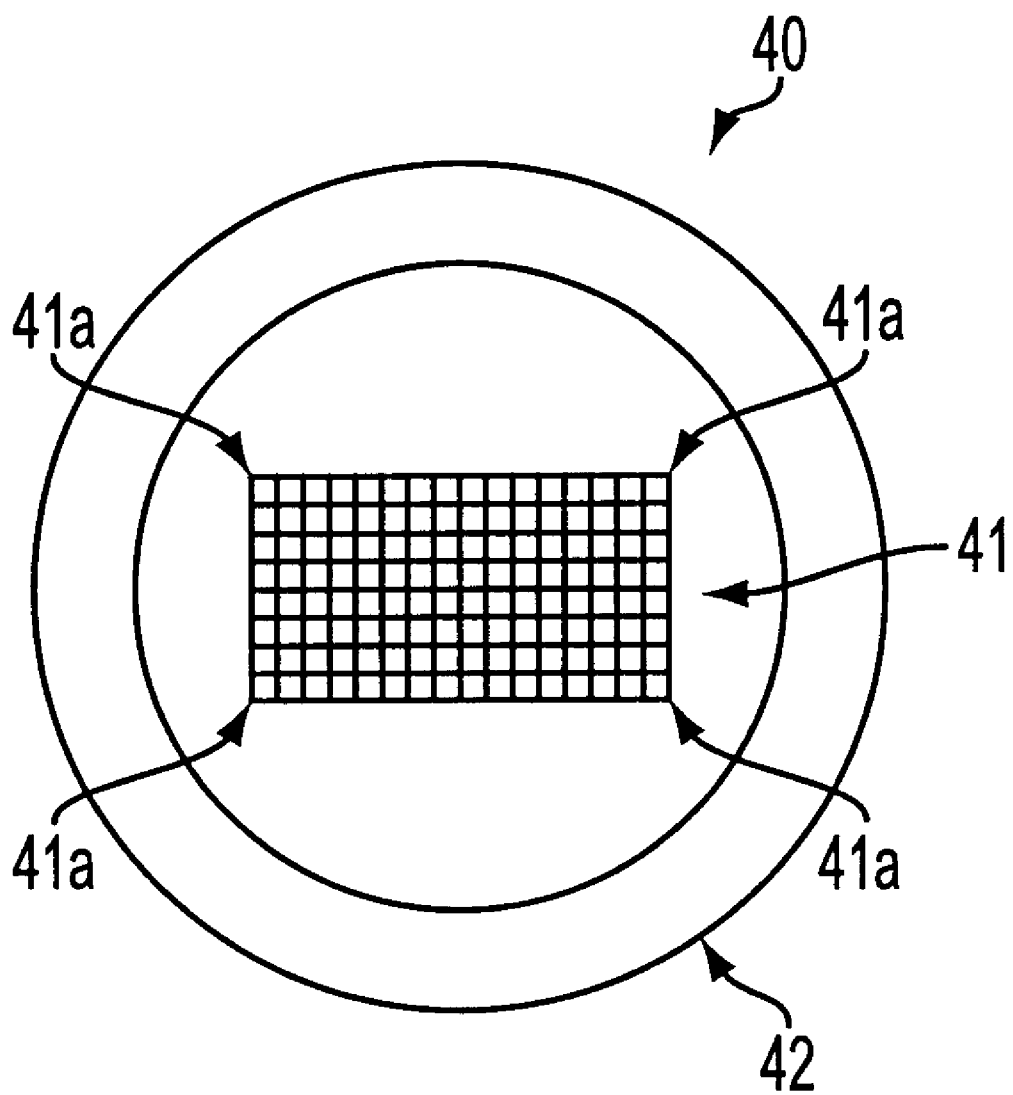
FIG. 4 illustrates an ordinary (i.e., non-pre-stressed) laminated ribbon stack located in a buffer tube.

The bending of the pre-stressed ribbon stack 30 of FIG. 3(a) will now be explained in more detail with reference to the example illustrated in FIG. 3(d). This figure uses as an example a ribbon stack of six ribbons horizontal laid on top of one another. The upper portion of the figure shows the stress distribution of the ribbon stack 30 after lamination, the middle portion shows the stress distribution of an ordinary ribbon stack bent with respect its axis (as discussed with respect to FIGS. 7(a) and 7(b)), and the lower portion of the figure shows the stress distribution of the pre-stressed ribbon stack when bent in such a manner. As shown in the lower portion of the figure, resulting stress in the stack is equal to zero.

As discussed above, the pre-stressed ribbon stack 30 of the third embodiment is curved or twisted due to its non-symmetric stress distribution. In twisted and stranded configuration (e.g., six buffer tubes housing ribbon stacks are stranded around a central strength member forming a helical path), the curvature of the ribbon stacks may be used to improve performance of the cable. That is, pre-curved ribbons can "naturally" accommodate subsequent curvilinear (e.g. helical) paths without inducing an additional bending of the stack, for example during the stack stranding in the slotted core.

Although the invention has been described with reference to specific embodiments and examples, this description is not meant to be construed in a limiting sense. For example, the ribbon stacks are not limited to including six ribbons, but may include any number so desirable. Also, the grams of force provided in the examples are merely used to explain the invention and are not limiting. Various modifications of the disclosed embodiments and example, as well as other embodiments and examples of the present invention, will become apparent to persons skilled in the art upon reference to the description of the invention. It is therefore contemplated that the appended claims will cover any such modifications, embodiments or examples as fall within the true scope of the invention.

What is claimed is:

1. An optical fiber ribbon stack, comprising:
    a plurality of optical fiber ribbons laminated together to form a stack;
    wherein some of the optical fiber ribbons include an internal force of a tensile pre-stress and some of the optical fiber ribbons include an internal force of a compression pre-stress.

2. An optical fiber ribbon stack, comprising:
    a plurality of optical fiber ribbons laminated together to form a stack;
    wherein some of the optical fiber ribbons include an internal force of one of a tensile pre-stress and a compression pre-stress, and wherein a stress distribution of the stack is symmetric.

3. The optical fiber ribbon stack according to claim 2, wherein the stack is straight.

4. The optical fiber ribbon stack according to claim 2, wherein the internal force of the outer ribbons is compression pre-stress and the internal force of the inner ribbons is tensile pre-stress.

5. The optical fiber ribbon stack according to claim 2, wherein the internal force of the outer ribbons is tensile pre-stress and the internal force of the inner ribbons is compression pre-stress.

6. The optical fiber ribbon stack according to claim 1, wherein a stress distribution of the stack is non-symmetric.

7. The optical fiber ribbon stack according to claim 6, wherein the stack is curved.

8. The optical fiber ribbon stack according to claim 1, wherein a stress distribution of the stack is anti-symmetric.

9. The optical fiber ribbon stack according to claim 6, wherein the internal tensile force of the ribbons gradually increases across the thickness of the ribbon stack.

10. A method for forming a pre-stressed ribbon stack for use in a cable, comprising the steps of:
    imparting different tensile stresses on respective ones of the plurality of ribbons; and
    laminating the pre-stressed ribbons to form a laminated ribbon stack;
    wherein after lamination, some of the ribbons include an internal force of a tensile pre-stress and some of the ribbons include an internal force of a compression pre-stress.

11. A method for forming a pre-stressed ribbon stack for use in a cable, comprising the steps of:
    imparting different tensile stresses on respective ones of the plurality of ribbons; and
    laminating the pre-stressed ribbons to form a laminated ribbon stack, wherein the stress distribution of the laminated ribbon stack is symmetric.

12. The method according to claim 11, wherein the laminated ribbon stack is straight.

13. The method according to claim 11, wherein the step of imparting tensile stresses comprises the steps of:
    imparting a first tensile stress on the outermost ribbons of the ribbon stack; and
    imparting a second tensile stress, which is greater that the first tensile stress, on the inner ribbons of the ribbon stack; and
    wherein after lamination the first tensile stress becomes a compression stress.

14. The method according to claim 11, wherein the step of imparting tensile stresses comprises the steps of:
    imparting a first tensile stress on the outermost ribbons of the ribbon stack; and
    imparting a second tensile stress, which is less that the first tensile stress, on the inner ribbons of the ribbon stack; and
    wherein after lamination the second tensile stress becomes a compression stress.

15. The method according to claim 10, wherein the stress distribution of the laminated ribbon stack is non-symmetric.

16. The method according to claim 15, wherein the laminated ribbon stack is curved for use in stranding in one of a helical path, slotted core and curvilinear groove.

17. The method according to claim 10, wherein the stress distribution of the laminated ribbon stack is anti-symmetric.

18. The method according to claim 17, wherein the laminated ribbon stack is curved for use in stranding in one of a helical path, slotted core and curvilinear groove.

19. The method according to claim 15, wherein the tensile stresses imparted on the respective ribbons gradually decreases from the upper-most ribbon to the lower-most ribbon.

20. The method according to claim 17, wherein the tensile stresses imparted on the respective ribbons gradually decreases from the upper-most ribbon to the lower-most ribbon.

* * * * *